United States Patent Office 3,533,157
Patented Oct. 13, 1970

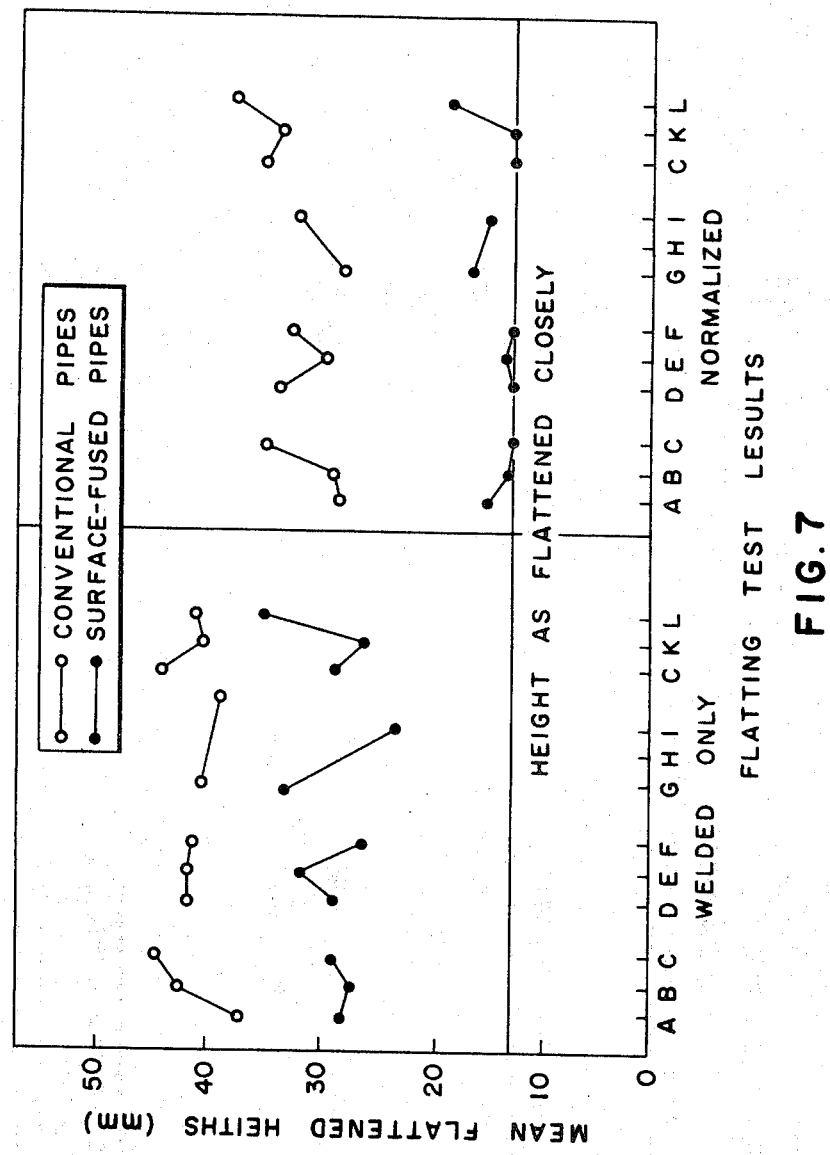

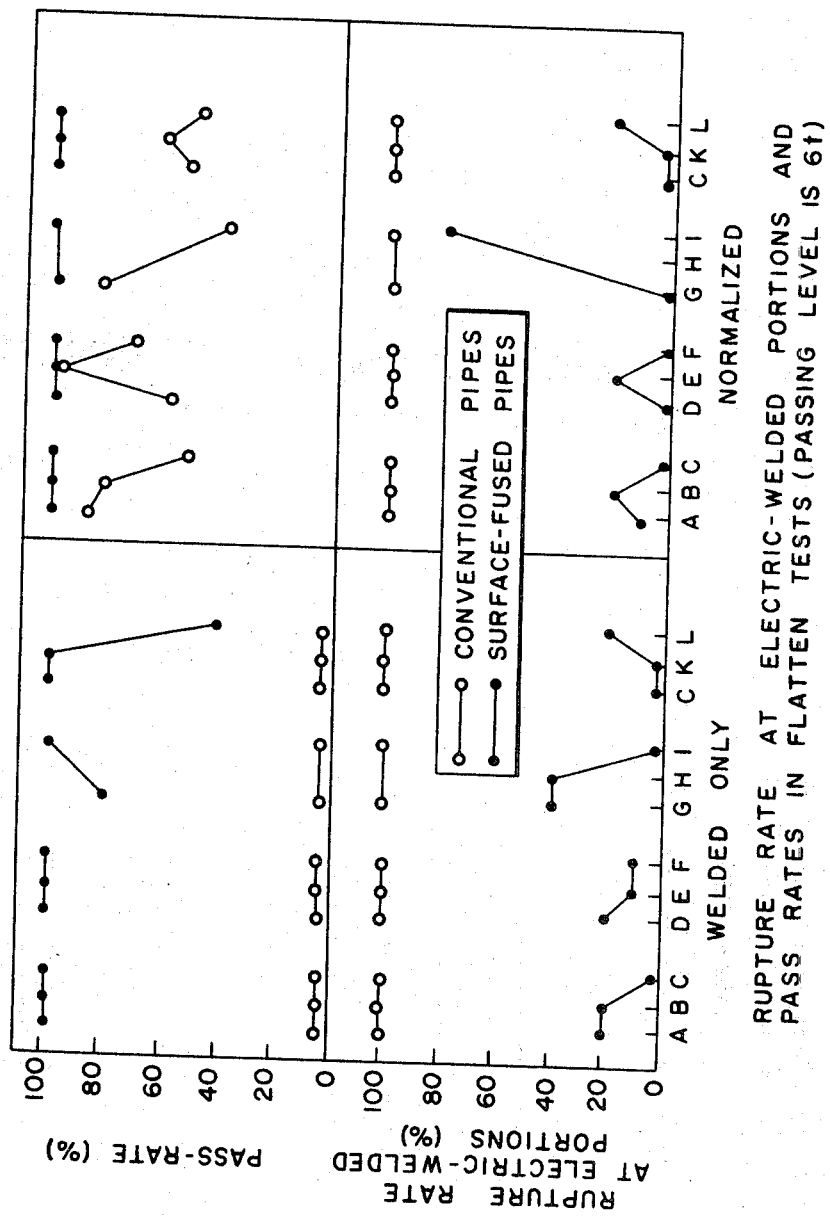

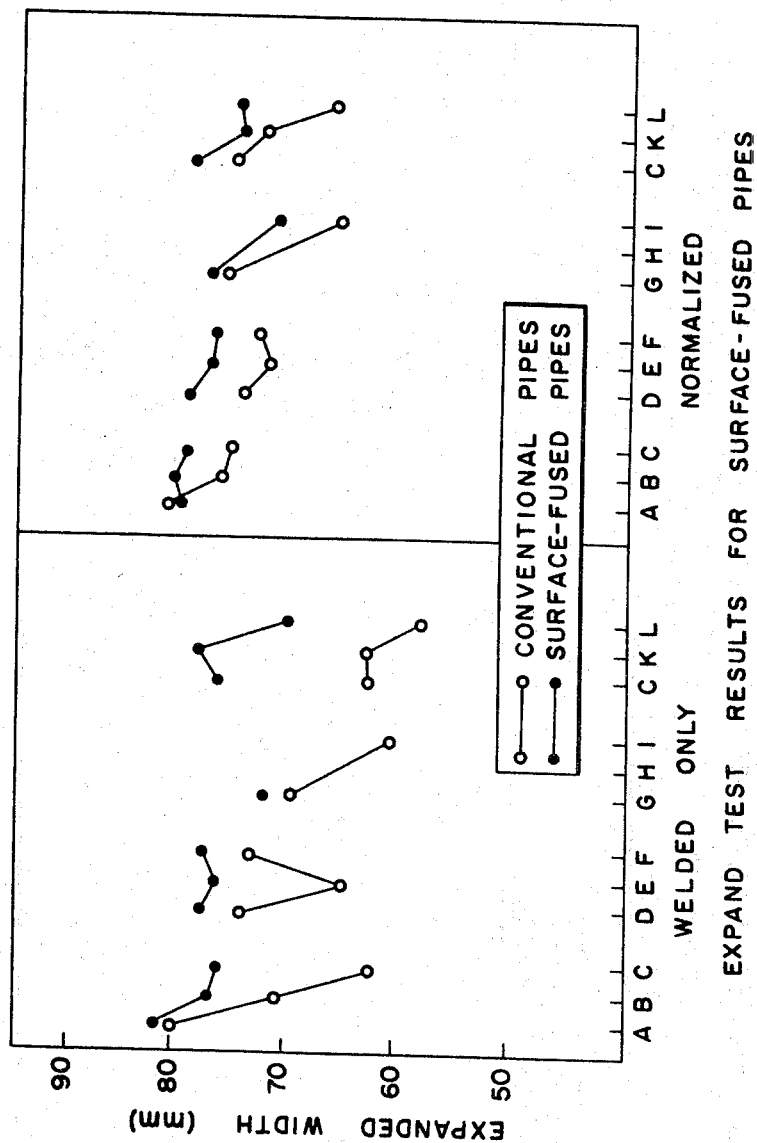

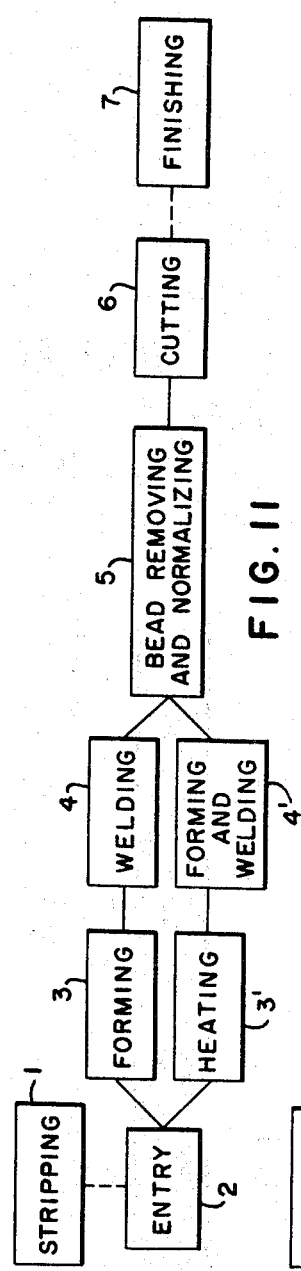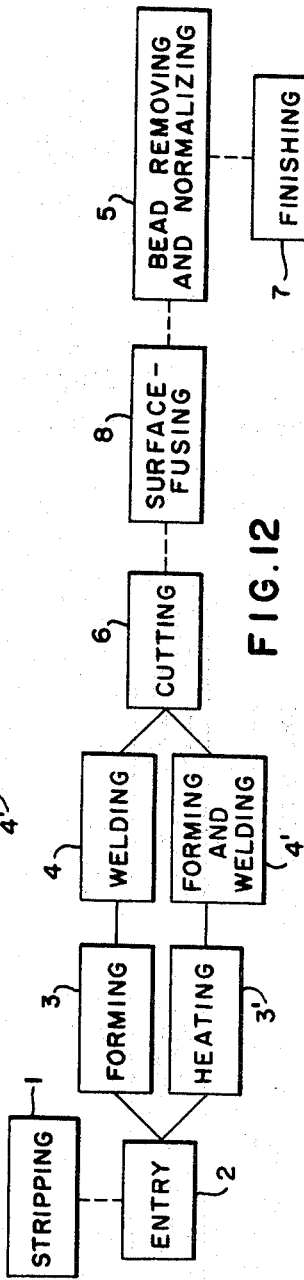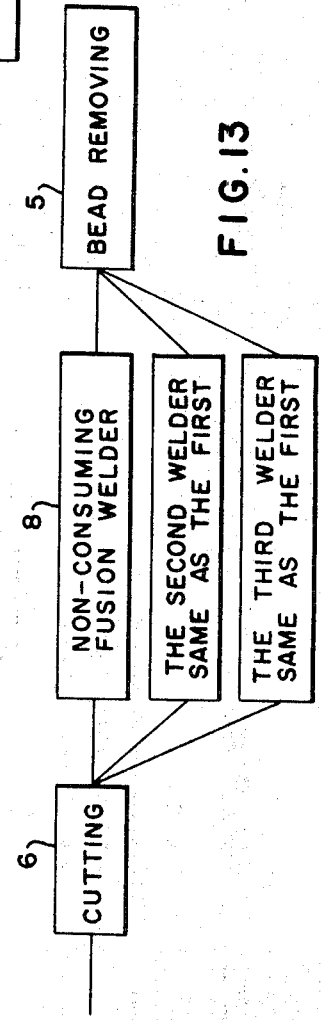

3,533,157
METHOD OF PRODUCING PRESSURE-WELDED PIPES
Yoshinori Ito and Isamu Koizumi, Hyogo-ken, Japan, assignors to Sumitomo Kinzoku Kogyo Kabushiki Kaisha, Osaka-shi, Japan
Filed Apr. 20, 1967, Ser. No. 632,293
Claims priority, application Japan, Apr. 23, 1966, 41/25,994
Int. Cl. B23k 31/02
U.S. Cl. 29—487                            3 Claims

ABSTRACT OF THE DISCLOSURE

A method for improving the strength of the welded sections of pressure-welded pipes by partially fusing a region including beads formed along the welded line from either outer or inner surface or from both sides in the depth between more than 2 mm. and smaller than ½ or ⅓ of the pipe wall thickness.

---

This invention relates to a processing method for remarkably improving the quality of the welded sections of pressure-welded pipes up to the qualitative level of the other (non-welded) sections of the same pipes, and to an over-all method of manufacturing the pressure-welded pipes including such processing method as said above. More particularly this invention relates to a processing method for improving the quality of the welded sections by fusing a small portion of the welded section which is extremely inferior to the non-welded section of the pipe in mechanical and other practically necessary properties. This invention relates also to an improved method of manufacturing pressure-welded pipes of high quality by adding to the conventional pressure-welded pipe manufacturing step said fusing step which can be achieved by a non-consumable fusion welding apparatus.

The present invention may be applied to the manufacture of pressure-welded pipes which are made of any material, as for example carbon steel, alloyed steel, copper, aluminum, and alloys of the last two, and produced by the pressure-welding method irrespective of the outer diameter and thickness of the pipes. It is particularly noticeable that conventional pressure-welded pipes which have been considered unusable under high temperature and pressure conditions because of their poor quality will be made usable by applying the processing method of this invention to them and also such usable ones will be produced directly from starting materials such as strip steels by using the over-all method of this invention.

The term "pressure-welded pipes" as used in this specification generally means such "welded pipes" that are manufactured by making a strip tubular in form so that both of the edges of the strip are closely opposed to each other and then welding the tubular strip at the edges while they are strongly pressed against each other and heated to approximately their melting point and also means welded pipes produced by a low-frequency or high-frequency electric resistance welding machine, a high-frequency induction welding machine or a continuous forge welding machine. While the "fusion-welded pipes" means welded pipes which are fusion-welded by charging fused metal to be deposited between tubular strip edges while they are fused. The non-consumable fusion welding apparatus means a welding apparatus by which welding is carried out by fusing a basis metal at the points thereof to be welded without any supply of deposit metal from other sources and includes an inert gas tungsten-arc welding machine (TIG), a plasma-arc welding machine, an electron beam welding machine, a high-frequency induction welding machine by linear inductors, and a gas welding apparatus using no welding rod.

For production of welded pipes, various pipe manufacturing methods have been developed and are practically used in the industry; and these pipes produced may be classified into two groups, pressure-welded pipes and fusion-welded pipes, according to the way of welding. Each of these groups of pipes has its own advantages and disadvantages. The most noticeable advantage of the pressure-welded pipes is that they are manufactured economically at an extremely high speed and high productivity with resultant low cost, as compared with the fusion-welded pipes. But they have a defect in terms of quality at the welded sections, so they cannot be applied to such uses where high quality and strength is required. Namely, the results of mechanical tests, such as tension, bending and impact tests, over the welded sections, and particularly the results of more-practical tests on the sections for flattening, flaring and high-temperature bursting, show that the welded section of the pressure-welded pipes are noticeably inferior in these properties to the other sections of the same pipes, in contrast with the fusion-welded pipes the properties of the welded sections of which are almost the same as or even better than other portions of the same pipes. Therefore, if these mechanical and more-practical properties at the welded sections of the pressure-welded pipes should be improved to the same level as the non-welded sections of the pipes by imparting a simple processing of this invention to the welded sections which are the only weak point of the pressure-welded pipes, it will be possible to improve the reliability on the quality of the pressure-welded pipes to an extent that it is well comparable not only with that of the fusion-welded pipes having the welded sections of the same quality as the base metal or the remaining, non-welded sections of the pipes, but also with that of the seamless pipes, thus permitting the pressure-welded pipes to be adapted for remarkably more applications than before whereas only those having a diameter of small or medium size or having a wall of small thickness have heretofore been employed for not heavy but light duty purposes. Thus, this invention permits the production, at low cost, of high-class pipes which require strict quality warranty. It is obvious that successful achievement of such techniques is highly desirable. The present invention was made with a view to developing such techniques.

The poor mechanical properties of the welded sections, which are the fatal defect of the pressure-welded pipes, are attributable to the following: The strip serving as the starting material from which the pipes are made is produced as a continuous hoop by hot rolling, so that the non-metallic inclusions and other impurities resulting from segregations, after the strip has been formed into a tube by a forming mill, are compressed in the circumferential direction of the tube to form a thin layer, and thus exist in a long extended form along the axial direction of the tube to compose the so-called fiber flow in both circumferential and axial directions of the strip in a tubular form. Thus, under a condition where this tubular strip has been pressure-welded, due to the fact that the opposed faces of the heated strip edges are bonded together with strong pressure by squeezing rolls, the fiber flow in the circumferential direction of the tubular strip is sharply reversed at these welded faces by pressures butting against each other thereat to change its direction by 90 degrees and flow itself towards both outer and inner surfaces of the pipe, while in this condition both the faces are welded together. Therefore, at the welded portions alone, there is formed a metallic structure of the fiber flow in the circumferentially perpendicular direction, which flow is of a different direction from that of the fiber flow in the circumferential direction of the non-welded portions of the same pipe. Also, the thinly extended layer of impurities shown as the fiber flow is orientated perpendicular to the circumference of the pipe at this narrow welded region, with the foremost end of the layer reaching the pipe surface, so that densified impurities are continuously concentrated along the direction perpendicular to the pipe circumference and from the surface of the welded section. It should be noted that the anisotropic fiber structure at said welded sections and the concentration of the densified impurities cannot be converted for improvement of the pipe in the succeeding pipe manufacturing processes such as normalizing treatment and naturally remain as textural features of the welded section in the finished article.

It is known that in general the directional properties or tropism of a fiber structure give rise to the particular directional properties or tropism in the mechanical natures of the metal material, and particularly, this causes a wide difference in the tension, bending and impact properties of the material. The metal material is therefore used in such a state where the fiber flow direction in it is in accord with a direction of stress given to the material in use. In the pipe material, too, the most preferred is such a condition under which the fiber flow direction is orientated in the circumferential direction, but in the pressure-welded pipes, although the non-welded sections thereof are under a preferred fiber flow condition, the welded sections alone have such fiber structure as is most frail to stress in the circumferential direction and most unfavorable directional properties, which structure will result in inferior mechanical properties at the welded sections to those of the non-welded sections of the pipe. Further, since the presence of the concentrated impurities extended continuously in the most unpreferred direction, which are either exposed on the surface of the welded sections or stay very closely thereto, constitutes the starting point of ruptures in the flattening, flaring, bending, high-temperature bursting, hydraulic and other practical tests, earlier ruptures will appear in the welded sections than in the non-welded ones. This presentation of the starting point of ruptures will have the most serious influence on the quality of the pressure-welded pipes. On the other hand, in the fusion-welded pipes, the unfavorable anisotropic fiber structure vanishes away and also the impurities existing in a densified, concentrated state are uniformly diluted and dispersed as the to-be-welded sections are fused to modify the structure of the welded sections to the cast structure, so the welded sections demonstrate the substantially same mechanical properties as the non-welded sections. Thus, the deterioration of various properties observed at the welded sections of the pressure-welded pipes is inherent to such pressure-welded pipes and is an inevitable defect incidental to conventional pressure welding.

It is, however, known from experience that the region where exists the above-described most unfavorable anisotropic structure of the welded sections seen only in the pressure-welded pipes is limited to a scope slightly wider than the welding bead. Also, it will be understood from the distribution of stress on the welded faces of the pipe under use that the densified impurities concentrated in said region are most likely to be a cause for rupture of the pipe only when they are exposed on the pipe surface or stay very close to the surface, and such danger of inviting the rupture is sharply decreased in proportion to the distance of the position wherein they are present from the surface towards the center of the pipe.

With the above-described matters in mind, the present invention has been attained as a result of extensive researches, studies and tests.

The primary object of this invention is to provide a method for processing the pressure-welded pipes to improve the mechanical and practical strength at the welded sections of pressure-welded pipes up to the level of the non-welded region thereof and to produce such pressure-welded pipes as have high quality sufficient to be fit for heavy duty purpose, and this processing method is characterized in that a small, limited region on and below the welded surface is heat treated by its temporary fusion. This processing is effected by fusing temporarily a limited, small region including the welded section. The region which has to be temporarily fused is as wide as the fiber flow portion exposed on the inner or outer surface of the pipe, the portion being somewhat wider than the welding beads, and is of depth from 2 mm. to a half of the pipe wall thickness from the surface of the pipe if the fusion is effected in either one of the outer and the inner surface layer. The depth mentioned above is one over which there are present the anisotropic fiber structure and densified impurities capable of a great effect on the strength of the pressure-welded pipes.

If the fusing treatment is effected in each of the outer and the inner surface layer, each of the regions to be temporarily fused in the layer is the same in dimension as above with the exception that it is of depth of 2 mm. to one-third of the pipe wall thickness from the corresponding surface of the welded section of the pipe.

Thus, this processing is accomplished by fusing temporarily the limited region to modify the metallic structure in the region to an isotropic cast structure in which the impurities are uniformly dispersed.

It should be noted that the fusing, if effected in excess of the width of the above-defined region, does not necessarily result in a better effect because of non-presence of the fiber flow exposed. The reason why the depth of the region to be fused is restricted to 2 mm. at smallest, is as follows:

It has been found operationally difficult to ensure less than 2 mm. deep fusion if the region which is less than 2 mm. deep in dimension should be attempted to be fused, and found that the depth of a to-be-fused region of a pressure-welded pipe having a thin wall such as a 3 mm. thick wall should be 2 mm. at least to enjoy the full effect of this invention. On the other hand, the reason for determining the largest depth to be a half or one-third of the pipe wall thickness is mentioned below:

Even if the fusion is made to a depth of more than ⅓ of the pipe wall thickness in case of processing from both surface sides or more than ½ of the pipe wall thickness in case of processing from one surface side where beads are formed in more abundance, no better effect proportional to the extent of processing can be expected, and instead, the strength of the pipe base metal should rather be improved. Thus the method of the present invention is useful for tubes having wall thickness of at least 4 mm. or at least 6 mm. depending on whether one side is partially fused or both sides are partially fused.

The secondary object of the present invention is to provide a method for manufacturing said pressure-welded pipes with improved quality, which comprises an effective step for facilitating said fusing process in addition to a pressure-welding step.

The pressure-welded pipe manufacturing method of the present invention utilizes a non-consumable fusion-welding apparatus as a fusion processing means. This apparatus is generally known in the art. It is desirable that the operational efficiency of the non-consumable fusion-welding apparatus is kept in line with that of the individual pipe manufacturing steps which flow continuously at a constant manufacturing speed. Therefore, in case the producing capacity of a single non-consumable fusion-welding apparatus is lower than that of other equipments, a continuous pipe is cut into pieces of a fixed size after the forming and welding steps and the ensuing steps are carried on by using a plurality of said non-consumable fusion-welding apparatus in combination.

The fusing process in the present invention is carried out in a condition where the bead is left over on the welded face, except in case the bead is present in extreme abundance. There is no need of supplementing molten metal for fusion, which permits utilization of a non-consumable apparatus as the fusing means which may also be an extremely simple non-consumable type fusing apparatus equipped only with a fusing means.

It is also to be noted that the fusing process in this invention is perfected only by fusing the welded sections of the pipe, so that there is no regard needed as to remodeling of the existing apparatus or technically specific operations.

The invention will be more clearly understood by reading the specifications with reference to the accompanying drawings, in which:

FIG. 7 is graphs showing the flattened height in a flattening test conducted over the conventional pressure-welded pipes and the ones manufactured by the present invention;

FIG. 8 is graphs showing the accepted rate and the base metal crack rate in a flattening test conducted over the conventional pressure-welded pipes and the ones by the present invention;

FIG. 9 is graphs showing the flared width in a flaring test conducted over the conventional pressure-welded pipes and the ones according to the present invention;

FIG. 11 is a flow sheet for manufacture of the conventional pressure-welded pipes; and FIG. 12 is a flow sheet for manufacture of the pressure-welded pipes according to the present invention.

FIG. 13 is a flow sheet for manufacture of the pressure-welded pipes according to the present invention showing the arrangement of plural fusing equipments in parallel.

The advantageous effects resulting from the present invention will be obvious from the following results of a series of practical tests in which a comparison is made between the non-processed pressure-welded pipes and the improved, surface-fused pressure-welded pipes of the present invention;

CARBON STEEL BOILER TUBE AND HEAT EXCHANGE TUBE

A slit hoop of 5.9 mm. thickness made of open-hearth steel comprising 0.23% of C, 0.18% of Si, 0.57% of Mn, 0.011% of P, 0.016% of S, 0.09% of Cu and the balance of iron, was formed into a continuous pipe by a forming mill and then thus formed pipe was seamed by a 450 kc./s. 140 kva. electric resistance welding machine to thereby form an electrically seamed steel pipe having an outer diameter of 50.8 mm$\phi$ and a thickness of 5.9 mm.

Some of thus prepared electrically seamed steel pipe were treated by an inert gas tungsten arc welding machine in argon stream of 10 liter/min., at the feeding speed of approximately 130 to 210 mm./min., and under conditions of the arc length of 2 to 3 mm., arc voltage of 16 to 17 volts and arc current of 130 to 230 amps. DCRP. Thus the bead surface was fused. Some of these fusion-treated welded pipes were further normalized by heating to 900° C. for 5 minutes and then air-cooled.

Figure 1:
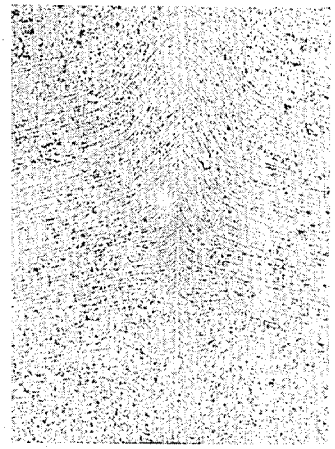
FIG. 1 is a macrophotograph showing the structure of the welded section of a pressure-welded pipe.
Figure 2:
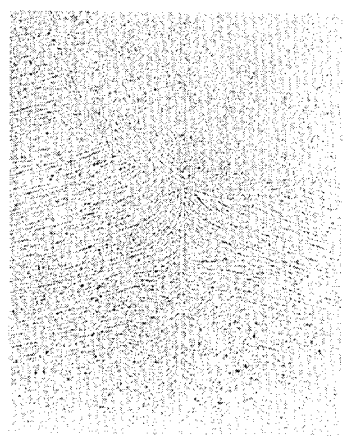
FIG. 2 is a macrophotograph of the welded section of an improved pressure-welded pipe processed according to the present invention.
Figure 3:
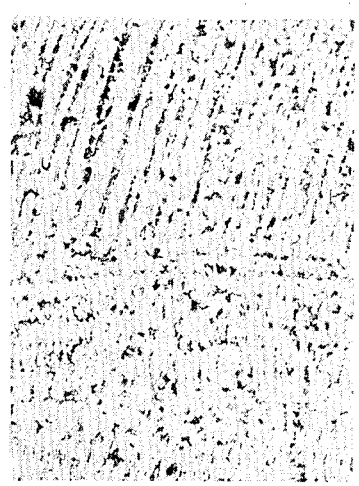
FIG. 3 is a microphotograph of the same section as in FIG. 2.

FIG. 1 is a photograph showing the structure of the welded section of a test piece of a tube subjected to a normalizing treatment without the surface fusion treatment, in which an unfavorable fiber flow changing its direction towards the pipe surface is observed at a region, near the surface, having about the same width as the bead and a depth of about ½ of the pipe thickness. It will also be noticed that a layer of concentrated impurities entrained by this flow may exist exposed on the surface, too. FIG. 2 is a photograph of the welded section of a test piece which was surface-fused by a depth of 2 mm. and normalized according to the present method, in which it will be noticed that the former structure deformed by the plastic working is perfectly extinguished at the fused region and is converted into a preferred isotropic structure regenerated by solidification. FIG. 3 is a 110 times-magnified photograph showing the microscopic structure at the boundary between the fused section and non-fused section shown in FIG. 2. FIG. 3 proves that the structure is perfectly improved.

Figure 4:
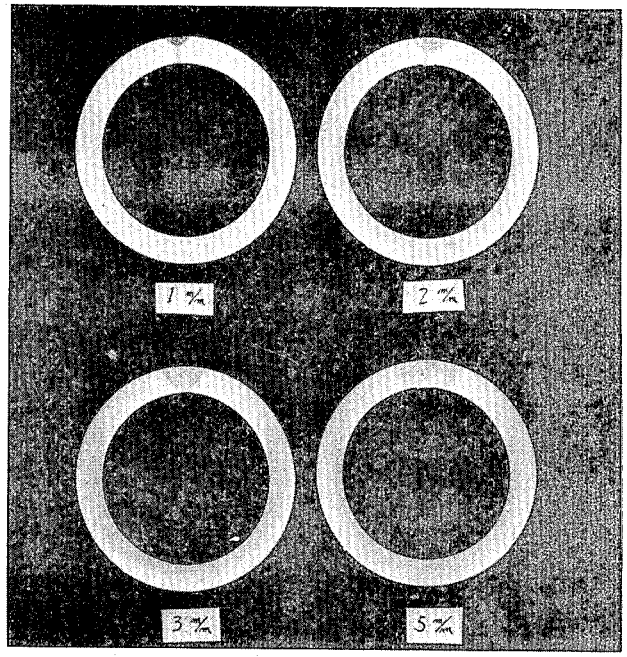
FIG. 4 is a photograph showing the welding condition in a pipe to be tested.

Now, the discussion will be made on the results of the practical tests conducted on the test pieces by varying the fused depth, to 1 mm., 2 mm., 3 mm. and 5 mm., according to the method of the present invention. FIG. 4 is a microphotograph of cut section of the pipes, showing the penetrating condition of these test pipes.

90° FLATTENING TEST

Figure 5:
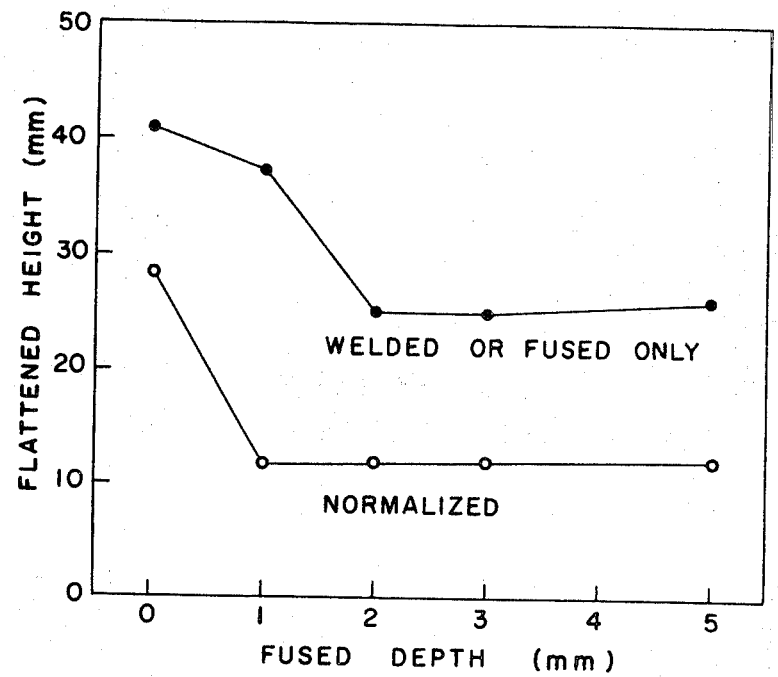
FIG. 5 is a graph showing the relationship between the fused depth and the flattened height in a flattening test conducted over the pressure-welded pipes manufactured by a conventional method and the ones manufactured by the present invention.

The results of the 90° flattening tests, in which the test pieces of tubes having a length of 50 mm. were compressed by keeping the welded sections perpendicular to the compressing direction until cracks were produced, are shown in Table 1. FIG. 5 shows the relationship between the fused depth and the flattened height.

TABLE 1

| | As pressure welded or as fused | | | | | Normalized after pressure-welded or fused | | | | |
|---|---|---|---|---|---|---|---|---|---|---|
| | | New method according to this invention | | | | | New method covered by this invention | | | |
| | Conventional | Fused depth | | | | Conventional | Fused depth | | | |
| | | 1 mm. | 2 mm. | 3 mm. | 5 mm. | | 1 mm. | 2 mm. | 3 mm. | 5 mm. |
| Flattened height in mm | 41 (H) | 38 (W+M) | 26 (W) | 26 (W) | 26 (W+M) | 29 (H) | (C) | (C) | (C) | (C) |
| | 41 (H) | 38 (W+M) | 22 (W) | 26 (W) | 25 (W+M) | 29 (H) | (C) | (C) | (C) | (C) |
| | 41 (H) | 36 (W+M) | 27 (W+M) | 23 (W+M) | 27 (W+M) | 29 (H) | (C) | (C) | (C) | (C) |
| | 42 (H) | 36 (W+M) | 26 (W+M) | 26 (W) | 26 (W+M) | 26 (H) | (C) | (C) | (C) | (C) |
| | 40 (H) | 38 (W+M) | 24 (W) | 24 (W+M) | 26 (W+M) | 30 (H) | (C) | (C) | (C) | (C) |
| Mean values | 41 | 37.2 | 25.0 | 25.0 | 26 | 28.6 | (C) | (C) | (C) | (C) |
| | 0.81 D | 0.73 D | 0.49 D | 0.49 D | 0.51 D | 0.57 D | 0.26 D | 0.26 D | 0.26 D | 0.26 D |

NOTE.—"D" shows diameter of the pipe. Capitals inside the parentheses show the positions at which cracks occured, where "H" designates electric-seamed portion, "W" fused portion, "M" base metal, and "W+M" shows the boundary between used portion and base metal, and "C" shows closely flatted.

Though the pipes not fusion treated according to the present invention all cracked at the electric-seamed portions, fusion treated pipes showed high degree of improvements on the flattening test results. Appreciable results are shown even in case of fusing to the depth of 2 mm. without normalizing and 1 mm. with normalizing.

Particularly, the tubes fused to the depth of 1 mm. and thereafter normalized are capable to completely flattened without any cracks.

FLARING TESTS

Figure 6:
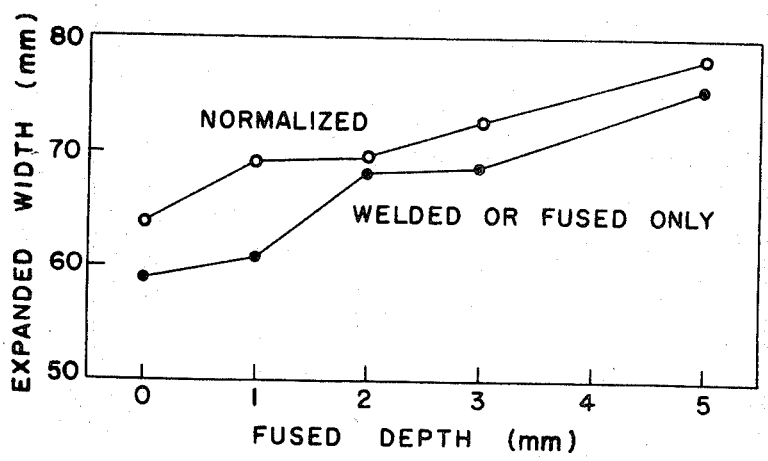
FIG. 6 is a graph showing the relationship between the fused depth and the flared width in a flaring test.

A conical tool with apex angle of 60° is used to flare the open-end of a test piece of a pipe of 100 mm. in length. Test results are shown in Table 2, and the relations of flared width to the depth of fusing are shown in FIG. 6.

Though about one half of pipes not worked are burst at the electric-seamed portions, all of fusion treated pipes according to the present invention are burst at the portions of base metal, with fusing depth of only 1 mm. This proves that only skin fusing improves strength of welded portions even more than that of base metal.

BOILER TUBE

The following series of testing concerns to the electric-seamed boiler tubes of 42 kg./mm.² class, of which

TABLE 2

| | As pressure-welded or as fused | | | | | Normalized after pressure-welded or fused | | | | |
|---|---|---|---|---|---|---|---|---|---|---|
| | Conventional | New method according to the present invention | | | | Conventional | New method according to the present invention | | | |
| | | Fused depth | | | | | Fused depth | | | |
| | | 1 mm. | 2 mm. | 3 mm. | 5 mm. | | 1 mm. | 2 mm. | 3 mm. | 5 mm. |
| Flared width in mm. | 59.0 (H) | 61.5 (W) | 79.3 (M) | 72.2 (M) | 76.5 (M) | 63.5 (H) | 68.0 (W) | 70.7 (M) | 73.7 (M) | 75.2 (M) |
| | 59.0 (H) | 59.0 (W) | 60.5 (W) | 60.5 (W) | 78.1 (M) | 63.2 (H) | 68.0 (W) | 68.2 (W) | 70.1 (W+M) | 80.0 (B) |
| | 55.5 (H) | 60.3 (W) | 73.0 (M) | 63.7 (W) | 76.0 (M) | 64.5 (H) | 72.0 (W) | 67.0 (W) | 79.3 (M) | 80.0 (B) |
| | 6.32 (H) | 59.1 (W) | 65.0 (W) | 76.8 (M) | 75.2 (W) | 63.0 (H) | 67.0 (W) | 68.4 (W+M) | 70.0 (W) | 80.1 (B) |
| | 59.1 (H) | 64.1 (W) | 63.0 (W) | 65.5 (W+M) | 71.0 (W) | 63.5 (W) | 70.7 (W) | 71.2 (M) | 69.5 (W) | 75.0 (M) |
| Mean values | 59.2 | 60.8 | 68.2 | 68.6 | 75.4 | 63.6 | 69.1 | 69.1 | 72.5 | 78.1 |
| | 1.17 D | 1.20 D | 1.34 D | 1.35 D | 1.48 D | 1.25 D | 1.36 D | 1.36 D | 1.43 D | 15.4 D |
| Base metal crack rate in percent | 0 | 0 | 40 | 50 | 60 | 0 | 0 | 50 | 50 | 100 |

NOTE.—Designations in parentheses are same as those in Table 1. Base metal crack is calculated to be 0.5 in case of (W+M). "B" desigantes the case when pipe results in buckling before being cracked, resulting in giving up of testing.

As in flattening tests the conventional pipes without fusion treatment are all cracked at the electri-seamed portions, fusion treated pipes according to the present method, however, showed improvements on the flaring test results. Appreciable results are shown in tubes fused to the depth of at least 2 mm. without normalizing and also fused to the depth only 1 mm. with normalizing.

BURST TESTS OF STEEL PIPES AT HIGH TEMPERATURE

Pipes of 300 mm. in length, which is extracted from sample pipes with normalizing, is exposed in the temperature of 400° C. for burst test, of which results are shown in Table 3.

testpiece sizes are equally selected to be 50.8 mm.φ in outer diameter and 5.9 mm. in wall thickness. All the conditions for forming, fusing and normalizing are kept constant in accordance with those of above-mentioned series of testing. As for chemical composition of the pipes, Si content varies from 0.10 to 0.26% in three steps, and C content 0.11 to 0.27% in three steps also, with corresponding Mn content 0.44 to 1.03%. Four specimens are provided for one testing on one sort of steels, and fusing depths according to the present invention are kept constant to be 2 mm. throughout the testings. Chemical composition of these testpiece pipes are shown in Table 4.

TABLE 4

| Tubes for test pieces | Chemical Composition, Percent | | | | | | | | |
|---|---|---|---|---|---|---|---|---|---|
| | C | Si | Mn | P | S | Cu | Sol. Al | N | O |
| A | 0.11 | 0.10 | 0.95 | 0.011 | 0.020 | 0.09 | 0.003 | 0.0060 | 0.014 |
| B | 0.11 | 0.16 | 1.03 | 0.014 | 0.023 | 0.09 | 0.005 | 0.0078 | 0.015 |
| C | 0.11 | 0.24 | 0.93 | 0.017 | 0.015 | 0.09 | 0.001 | 0.0115 | 0.014 |
| D | 0.19 | 0.09 | 0.69 | 0.017 | 0.030 | 0.07 | 0.003 | 0.0069 | 0.08 |
| E | 0.19 | 0.18 | 0.75 | 0.019 | 0.019 | 0.07 | 0.003 | 0.0066 | 0.06 |
| F | 0.20 | 0.24 | 0.80 | 0.014 | 0.012 | 0.06 | 0.004 | 0.0088 | 0.07 |
| G | 0.27 | 0.13 | 0.45 | 0.017 | 0.006 | 0.07 | 0.004 | 0.0097 | 0.011 |
| I | 0.25 | 0.26 | 0.44 | 0.022 | 0.006 | 0.07 | 0.003 | 0.0078 | 0.011 |
| K | 0.17 | 0.26 | 1.00 | 0.012 | 0.011 | 0.09 | 0.002 | 0.0064 | 0.004 |
| L | 0.24 | 0.26 | 1.02 | 0.018 | 0.013 | 0.06 | 0.002 | 0.0064 | 0.003 |

TABLE 3

| | Rupture stress in kg./mm. | | Elongation percentage in burst portion | | Reduction percentage of area at burst portion | | Burst position |
|---|---|---|---|---|---|---|---|
| Conventional method | 39.9<br>44.0<br>41.9<br>38.5 | Average (41.1) | 13.5<br>17.4<br>7.0<br>17.4 | Average (13.8) | 21.1<br>36.5<br>13.4<br>42.2 | Average (28.3) | H<br>M<br>H<br>M |
| New method under this invention—Fusing depth: | | | | | | | |
| 1 mm | 43.1<br>44.5<br>37.9<br>41.2 | Average (41.7) | 19.2<br>19.9<br>15.8<br>17.5 | Average (18.1) | 43.3<br>39.1<br>41.3<br>37.9 | Average (40.4) | M<br>M<br>M<br>M |
| 2 mm | 45.1<br>37.2<br>44.0<br>38.1 | Average (41.1) | 20.8<br>15.3<br>19.1<br>16.4 | Average (17.9) | 39.7<br>18.2<br>41.8<br>41.7 | Average (35.4) | M<br>M<br>M<br>M |
| 3 mm | 43.7<br>45.6<br>43.7<br>36.3 | Average (42.3) | 20.0<br>20.9<br>15.8<br>20.8 | Average (19.4) | 43.1<br>41.5<br>47.0<br>39.4 | Average (42.8) | M<br>M<br>M<br>M |
| 5 mm | 45.7<br>43.7<br>44.3<br>35.9 | Average (42.4) | 18.8<br>22.1<br>22.1<br>19.2 | Average (20.6) | 42.9<br>41.3<br>38.2<br>36.9 | Average (39.8) | M<br>M<br>M<br>M |

NOTE.—Numerals in parentheses show mean values.

90° FLATTENING TEST

FIGS. 7 and 8 show mean values of flattened heights, pass rates for the inspection and cracking rates at base metal on each sort of steels, with which pipes are formed being as pressure-welded or as fused, or being normalized after the processes. The rate for passing the inspection is determined based on $6t=35.4$ mm. ($t$ is wall thickness of tube and 35.4 mm. corresponds to 34.0 mm. in Japanese Industry Standard or ASTM standards).

Appreciable improvements on flattening property compared to conventional tube are obtained for each of test piece pipes produced by new method according to the present invention to fuse the surfaces of pipes to the depth of 2 mm.

Without fusion treatment any kinds of steel satisfy above-mentioned reference unless normalizing, on the other hand most of steel treated according to the present invention satisfy above-mentioned specification. Cracks occur at the electric-seamed portions for all the pipes without fusion treatment, though more than 80% of fusion treated tubes by the invention are cracked at their base metal portions. Even possible is closely flattening till inner surfaces come to contact for most of pipes being normalized, proving the improvement of flattening property on the electric-seamed portions to be even better than that of base metal itself.

FLARING TESTS

Figure 10:
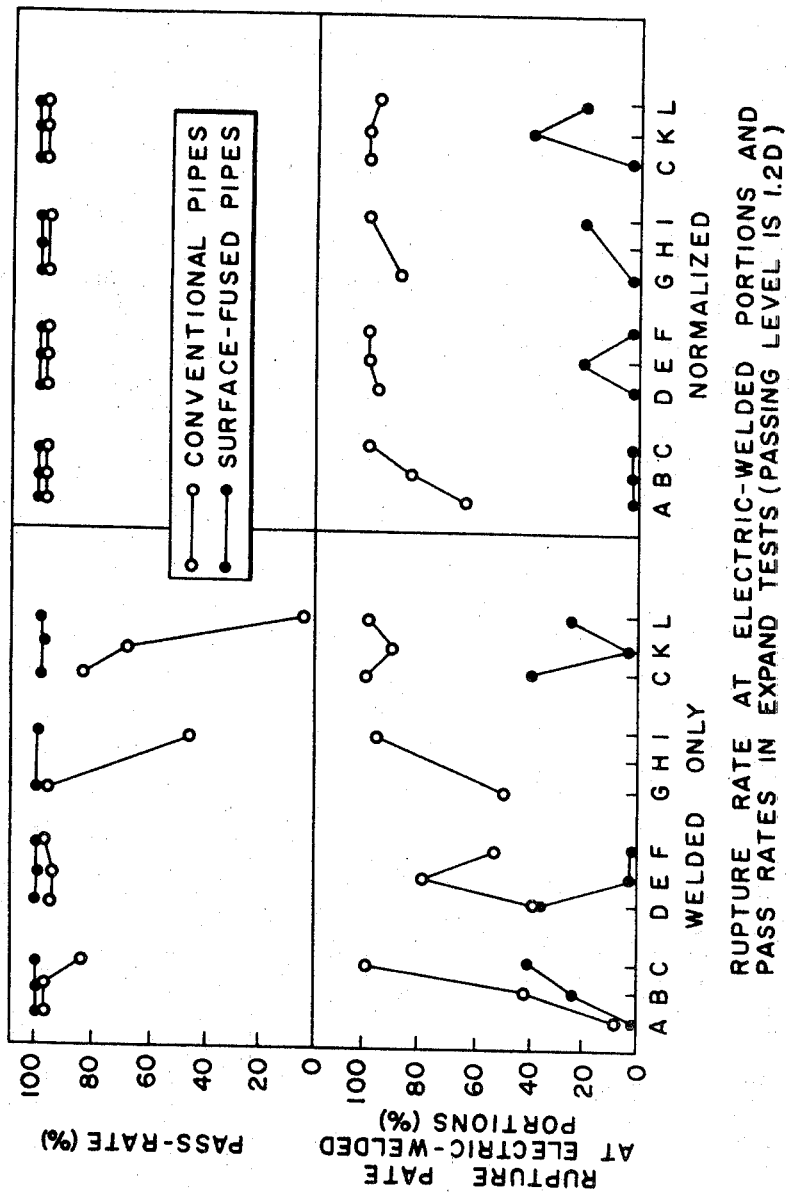
FIG. 10 is graphs showing the accepted rate and the base metal crack rate in a flaring test conducted over the conventional pressure-welded pipes and the ones manufactured according to the present invention.

FIGS. 9 and 10 show mean values of flared width, pass rates for the inspection and cracking rates at base metal on each sort of steel pipes which are as pressure-welded or as fused, and normalized after fusion treatment. The rate for passing the inspection is determined based on $1.2D=60.96$ mm. according to Japanese Industry Standards, wherein D is outer diameter, and 60.5 mm. corresponds to 60.5 mm. according to the ASTM standards. FIGS. 10 and 11 show that appreciable improvements on flaring property are obtained for each of test pipes obtained by new method of the present invention to fuse the surfaces of tubes to the depth of 2 mm. Cracks at the electric-seamed portions are decreased in high degree. Especially this process is found more effective for steels containing plenty of C and Si, which had been believed unsuitable for production of electroseamed tube. Thus the property of welded portions is improved so remarkably that the properties of base metal itself even relates to the flaring test results directly.

ELECTRIC-SEAMED STEEL TUBES FOR PIPE LINE

The following series of testings are carried on the electric-seamed steel pipes of middle grade diameter for pipe line. Test pieces of the pipes are sampled out of electric-seamed ones which are welded by a 180 c./s., 2000 kva. low frequency electric resistance welding machine. The test pipes are made of open-hearth steel, referred to 5 LX-X 42 by the API standards, and of which chemical composition are: 0.21% of C, 0.02% of Si, 0.73% of Mn, 0.019% of P and 0.019% of S. The outer diameter and wall-thickness of pipe are 325 mm.$\varphi$ and 12.7 mm. respectively. Test pipes by conventional method are air-cooled after heating to 900° C. for 5 minutes as above mentioned. Two other sorts of pipe samples are prepared according to the present invention: in one of these examples outer surfaces of the welded portions are fused to the depth of 4 mm. and then normalized, and in other samples, both of inner and outer surfaces are fused to the depth of 4 mm. and normalized also under the same conditions mentioned above. These samples are tested as follows:

90° FLATTENING TESTS

Table 5 shows the results of the flattening tests carried out on test pieces of tubes of 325 mm.$\phi$ diameter, 12.7 mm. thickness and 60 mm. length.

TABLE 5

| Conventional method | | | New method according to the present invention | | | | | |
|---|---|---|---|---|---|---|---|---|
| | | | Outer surface only is fused | | | Outer and inner surfaces are both fused | | |
| Flattened height in mm. | Elongation at the electric-seamed portions, percent | Cracked portion | Flattened height in mm. | Elongation at the electric-seamed portions, percent | Cracked portion | Flattened height in mm. | Elongation at the electric-seamed portions, percent | Broken portion |
| 76 | 27 | H | 50 | 33 | W+M | 46 | 47 | W+M |
| 96 (96.0) | 20 (22) | H | 65 (56.0) | 40 (37) | W+M | 55 (51.4) | 33 (35) | W+M |
| 105 0.297 D | 20 | H | 53 | 40 | W+M | 47 0.157 D | 33 | W+M |
| 112 | 20 | H | 57 0.172 D | 40 | W | 59 | 27 | W+M |
| 90 | 22 | H | 55 | 33 | W | 50 | 33 | W+M |

NOTE.—Gauge length for elongation is 15 mm. Numerals inside the parentheses show mean values.

In case of conventional method, flattened height is 97.2 mm. (0.297D) and all of failures occur at the electric-seamed portions. On the other hand, in tubes according to the present invention, the flattening property is remarkably improved and the flattened height decreased nearly by ½ as has been shown regarding pipes in smaller diameters, and this is true not only for those pipes fused on both surfaces, but also for those fused on outer surface only.

BENDING TESTS ON ELECTRIC-SEAMED PORTIONS

Severe test are carried out on test tubes of 300 mm. x 12.7 mm. x 32 mm. by bending said test tubes by bender roller to bending radius of $2t$ (25.4 mm.).

The results obtained are shown in Table 6.

TABLE 6

| Conventional method, untreated | | | | New method according to the present invention | | | | | | | |
|---|---|---|---|---|---|---|---|---|---|---|---|
| Trace bend | | Reverse bend | | Outer surface only is fused | | | | Outer and inner surfaces are both fused | | | |
| | | | | Trace bend | | Reverse bend | | Trace bend | | Reverse bend | |
| Results | Broken portion | Results | Broken portion | Results | Broken portion | Results | Broken portion | Results | Broken portion | Results | Broken portion |
| Fault | H | Fault | H | Pass | | Fault | H | Pass | | Pass | |
| Do | H | do | H | do | | do | H | do | | do | |
| Do | H | do | H | do | | do | H | do | | do | |
| Do | H | do | H | do | | do | H | do | | do | |
| Do | H | do | H | do | | do | H | do | | do | |

In case of "Control," all the samples are cracked at their electric-seamed portions, and failed in both of face and reverse bending tests. On the other hand in case of outer-surface fusing according to the present invention, all passed in the face bending tests, though failed in reverse bending. Moreover, those pipes of which both surfaces are fused according to the invention are capable of being bent until they are completely folded in both of face and reverse 180° bendings, which eloquently proves improvements in property of the fused portions.

The fusing treatment according to the present invention, wherein pressure-welded portion of a pipe is fused to the depth of 2 mm. on the surface of the pipe including bead width, improves the useful properties of the fused portions such as flattening, flaring or burst properties at high temperature in high degree as nearly equal to those of base metal itself, as it has been clear in the above descriptions. Such improvements on the properties of the fused portions even better than those of base metal itself can be obtained by fusing one half of all thickness from one surface only, or by fusing ⅓ of wall thickness from both surfaces. More deep fusing is of no effect, as has been shown, unless properties of base metal themselves are changed.

Although a series of testing is mentioned above only for the electric-seamed steel pipes, it will be understood that this process is effective for all the pressure-welded pipes such as radio-frequency induction-welded pipes or forge-welded tubes, so far as their welded portions are of anisotropic fiber structures.

It will be noted furthermore that all the tests mentioned are carried out at the running production scale: not only the apparatuses for forming and normalizing of test pieces of pipes, but also inert-gas tungsten-arc equipment. The surface fusion-treatment can be combined in any conventional method of manufacturing pressure-welded pipes. The following is the description on the improved manufacturing method for pressure-welded pipes, where surface-fusing process according to this invention is inserted in the production line of usual ones.

FIG. 11 shows usual process for pressure-welded pipes in brief, where welding is undertaken by electric resistance heating or by radio-frequency induction-heating.

The pipe forming process consists, as is shown in the figure, of stripping process referred to by 1, entry by 2, forming by 3, welding by 4, bead removing and normalizing by 5, cutting by 6 and finishing process referred to by 7. Continuous-welding pipe-forming system is also available, where heating process and forming and welding processes, referred to by 3′ and 4′ respectively, are added as are shown also in the figure.

In general, in the manufacturing system for pressure-welded pipes, succeeding steps from entry 2 to cutting 5 are continuous process, wherein long length of pipes are produced from long length strips, and then said continuous pipes are cut into constant length as products at the cutting procedure.

According to the present invention, the pipes obtained through steps 2 to 5 are cut into pipes of constant length, and then as shown in FIG. 12, fusing treatment is carried out. Bead-removing, normalizing and sizing steps follow the fusion-treatment step. In order to keep equal the production speed throughout entry 2 to cutting 6 and the speed of the fusion treatment, it needs to arrange plural fusing equipments in parallel as is shown in FIG. 13.

What is claimed is:

1. A method of producing welded pipe from elongated metal strip in which the latter is formed into tubular configuration with opposed edges, comprising the steps of heating such edges to plasticity, pressing said heated edges together to form a weld joint having a bead, and after the edges have been pressed together and the joint has been formed, fusing said joint over an area greater than the width of said bead to encompass said bead and an area on each of the latter in which the fiber flow of the pipe is generally longitudinally disposed, said fusing being effected to a depth of at least 2 mm. but no greater than one-half of the pipe wall thickness, and subsequently normalizing said pipe by applying a heat treatment, said fusing step improving the strength of the welded portion of the pipe to substantially equal the strength of the unwelded portion.

2. A method according to claim 1 wherein said fusing is effected internally and externally of the pipe over an area greater than the width of said bead.

3. A method according to claim 2 wherein said internal and external fusing is effected to a depth no greater than ⅓ of the pipe wall thickness.

References Cited

UNITED STATES PATENTS

| | | | |
|---|---|---|---|
| 1,554,546 | 9/1925 | Austin | 285—286 X |
| 2,669,639 | 2/1954 | Bowman | 29—497 X |
| 2,673,276 | 3/1954 | Allardt | 29—487 X |

JOHN F. CAMPBELL, Primary Examiner

R. J. SHORE, Assistant Examiner

U.S. Cl. X.R.

29—497; 148—27; 285—286